United States Patent
Park et al.

(10) Patent No.: US 12,183,515 B2
(45) Date of Patent: Dec. 31, 2024

(54) CERAMIC ELECTRONIC COMPONENT

(71) Applicant: SAMSUNG ELECTRO-MECHANICS CO., LTD., Suwon-si (KR)

(72) Inventors: Seong Hwan Park, Suwon-si (KR); Kyung Moon Jung, Suwon-si (KR); Sung Jun Lim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 75 days.

(21) Appl. No.: 17/706,005

(22) Filed: Mar. 28, 2022

(65) Prior Publication Data

US 2023/0197342 A1 Jun. 22, 2023

(30) Foreign Application Priority Data

Dec. 16, 2021 (KR) .................. 10-2021-0180897

(51) Int. Cl.
*H01G 4/232* (2006.01)
*H01G 4/12* (2006.01)
*H01G 4/30* (2006.01)

(52) U.S. Cl.
CPC ............. *H01G 4/2325* (2013.01); *H01G 4/30* (2013.01); *H01G 4/1227* (2013.01)

(58) Field of Classification Search
CPC ....... H01G 4/2325; H01G 4/30; H01G 4/1227
See application file for complete search history.

(56) References Cited

U.S. PATENT DOCUMENTS

| | | | |
|---|---|---|---|
| 2006/0114641 A1* | 6/2006 | Iwasaki | C04B 35/6303 501/135 |
| 2015/0021082 A1 | 1/2015 | Park et al. | |
| 2015/0022945 A1* | 1/2015 | Park | H01G 4/2325 156/89.18 |
| 2017/0256359 A1* | 9/2017 | Masunari | H01G 4/005 |
| 2017/0278635 A1* | 9/2017 | Mizuno | H01G 2/065 |
| 2018/0025845 A1* | 1/2018 | Sato | H01G 2/103 361/321.2 |

(Continued)

FOREIGN PATENT DOCUMENTS

| | | |
|---|---|---|
| KR | 10-2015-0009922 A | 1/2015 |
| KR | 10-2020-0031000 A | 3/2020 |

*Primary Examiner* — Michael P McFadden
(74) *Attorney, Agent, or Firm* — MORGAN, LEWIS & BOCKIUS LLP

(57) ABSTRACT

A ceramic electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first band electrode disposed on a portion of the first surface adjacent to the third surface; a second band electrode disposed on another portion of the first surface adjacent to the fourth surface; and insulating members disposed between the first and second band electrodes disposed on the first surface and spaced apart from each other, wherein the first surface is exposed through a space between the plurality of insulating members.

21 Claims, 17 Drawing Sheets

(56) References Cited

U.S. PATENT DOCUMENTS

| | | | |
|---|---|---|---|
| 2018/0082787 A1* | 3/2018 | Hamamori | H01G 4/232 |
| 2018/0144868 A1* | 5/2018 | Park | H05K 1/181 |
| 2018/0174753 A1* | 6/2018 | Terashita | H01G 4/008 |
| 2018/0182554 A1* | 6/2018 | Park | H01G 4/30 |
| 2019/0066918 A1* | 2/2019 | Jeong | H01G 4/005 |
| 2019/0103224 A1* | 4/2019 | Han | H01G 4/2325 |
| 2019/0131076 A1* | 5/2019 | Fukumura | H01G 4/232 |
| 2020/0066444 A1* | 2/2020 | Yang | H01G 4/12 |
| 2020/0066447 A1* | 2/2020 | Murai | H01G 4/30 |
| 2020/0090871 A1 | 3/2020 | Ahn et al. | |

* cited by examiner

CERAMIC ELECTRONIC COMPONENT

CROSS-REFERENCE TO RELATED APPLICATIONS

This application claims benefit of priority to Korean Patent Application No. 10-2021-0180897 filed on Dec. 16, 2021 in the Korean Intellectual Property Office, the disclosures of which are incorporated herein by references in its entirety.

TECHNICAL FIELD

The present disclosure relates to a ceramic electronic component, and more particularly, to a multilayer ceramic capacitor.

BACKGROUND

Recently, a greater number of multilayer ceramic capacitors have been applied to various electronic devices due to increased capacitance thereof. As one method for implementing this, a bottom electrode structure which may increase an effective volume of a multilayer ceramic capacitor has been developed. The bottom electrode structure may reduce a mounting area of a substrate such that high density may be implemented.

However, a multilayer ceramic capacitor having a bottom electrode structure may have a relatively reduced soldering area, different from a general electrode structure, such that a chip may easily fall off due to a decrease in adhesion strength when mounted on a substrate.

SUMMARY

An aspect of the present disclosure is to provide a ceramic electronic component having improved adhesion strength when mounted on a substrate.

Another aspect of the present disclosure is to provide a structure which may, by forming a plurality of insulating members on a lower surface of a ceramic body on which a band electrode is disposed, disperse concentration of stress at a notch point.

According to an aspect of the present disclosure, a ceramic electronic component includes a body including a dielectric layer and a plurality of first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first band electrode disposed on a portion of the first surface adjacent to the third surface; a second band electrode disposed on another portion of the first surface adjacent to the fourth surface; and a plurality of insulating members disposed between the first and second band electrodes disposed on the first surface and spaced apart from each other, wherein the first surface is exposed through a space between the plurality of insulating members.

According to an aspect of the present disclosure, a ceramic electronic component includes a body including a dielectric layer and a plurality of first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first connection electrode disposed on the third surface; a first band electrode extending from the first connection electrode to a portion of the first surface; a second connection electrode disposed on the fourth surface; a second band electrode extending from the second connection electrode to a portion of the first surface; and a plurality of insulating members disposed between the first and second band electrodes on the first surface, respectively, and connected to at least one of the first and second band electrodes.

According to an aspect of the present disclosure, a ceramic electronic component includes a body including a dielectric layer and a plurality of first and second internal electrodes alternately disposed with the dielectric layer interposed therebetween, and including first and second surfaces opposing each other in a stacking direction of the plurality of first and second internal electrodes; only two band electrodes disposed on the first surface; and at least one insulating member disposed on the first surface and between the two band electrodes, wherein the ceramic electronic component has a bottom electrode structure.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Hereinafter, embodiments of the present disclosure will be described as follows with reference to the attached drawings.

In the accompanying drawings, some elements may be exaggerated, omitted or briefly illustrated, and the sizes of the elements do not necessarily reflect the actual sizes of these elements.

Figure 1:
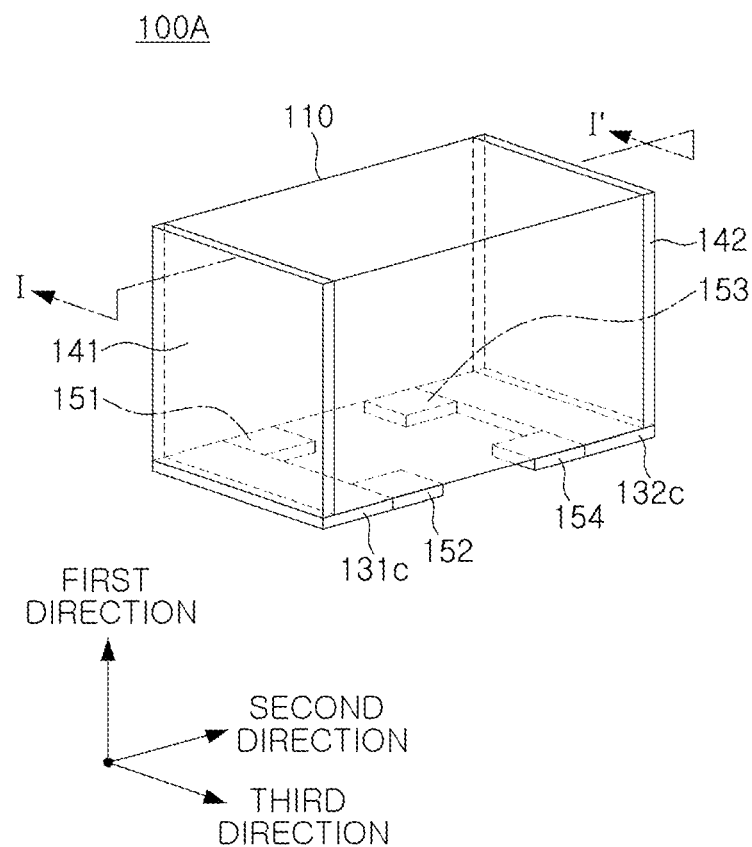
FIG. 1 is a perspective diagram illustrating a ceramic electronic component according to an example embodiment of the present disclosure.

FIG. 1 is a perspective diagram illustrating a ceramic electronic component according to an example embodiment.

Figure 2:
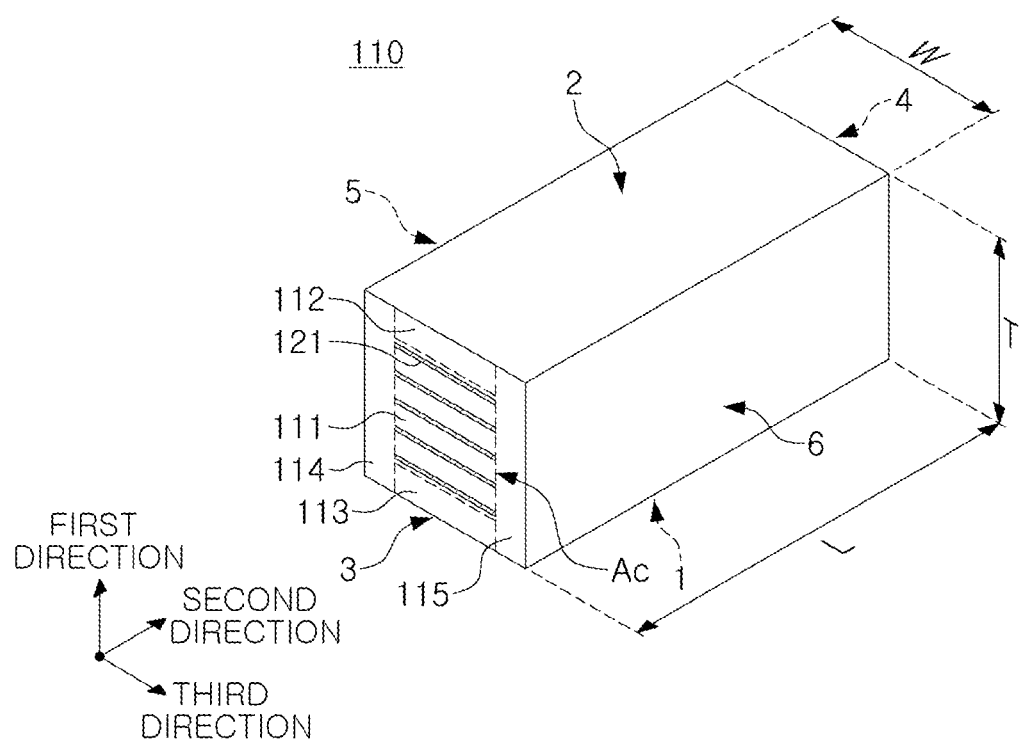
FIG. 2 is a perspective diagram illustrating a ceramic electronic component according to an example embodiment of the present disclosure.

FIG. 2 is a perspective diagram illustrating a ceramic electronic component according to an example embodiment.

Figure 3:
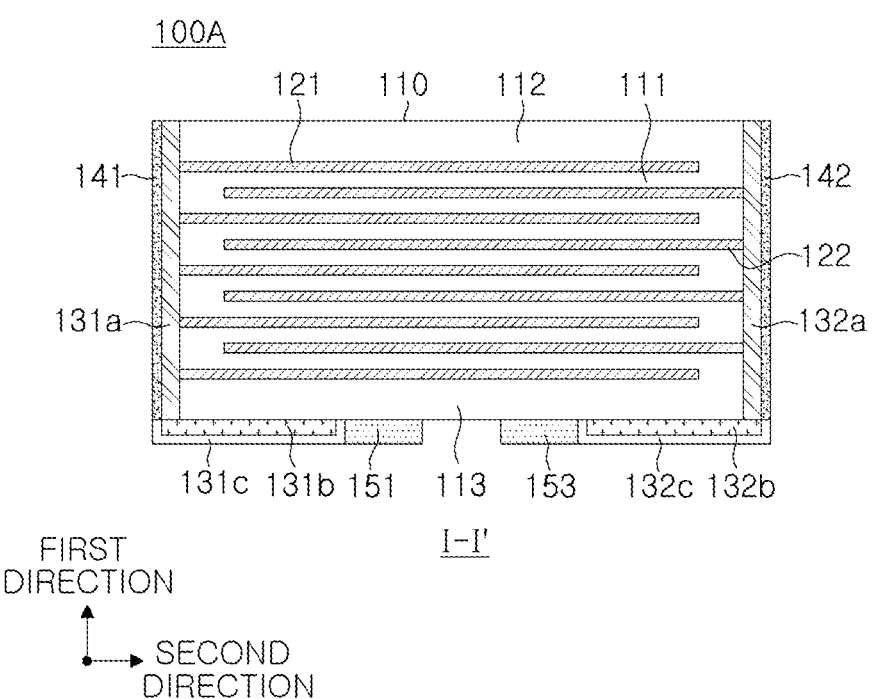
FIG. 3 is a cross-sectional diagram taken along line I-I' in FIG. 1.

FIG. 3 is a cross-sectional diagram taken along line I-I' in FIG. 1.

Figure 4:
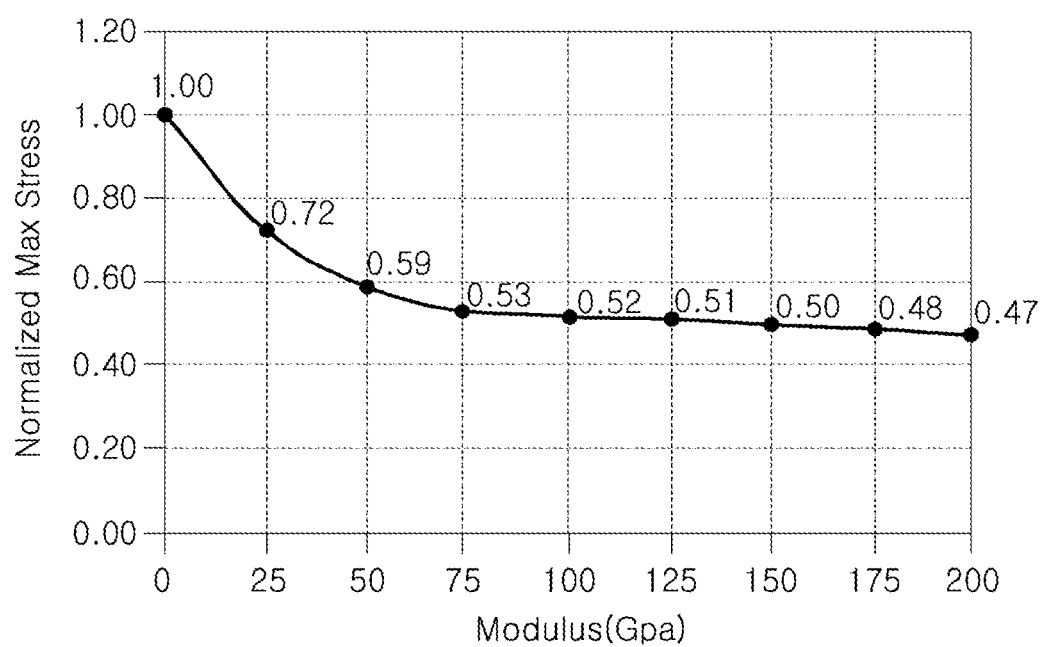
FIG. 4 is a graph illustrating a result of stress analysis according to a modulus of a plurality of insulating members of a ceramic electronic component in FIG. 1.

FIG. 4 is a graph illustrating a result of stress analysis according to a modulus of a plurality of insulating members of a ceramic electronic component in FIG. 1.

In FIG. 1, to illustrate the lower structure of the ceramic electronic component, components in the body, such as, for example, internal electrodes, are not illustrated.

The result of stress analysis in FIG. 4 is a result of analyzing stress when cracks occur in an adhesion strength test for each modulus, and in this case, the adhesion strength test was performed by mounting the ceramic electronic component on the substrate and pushing the ceramic electronic component on the substrate using a tip. For example, a comparative ceramic electronic component without an insulating member corresponds to the data point for a modulus of 0 GPa while the other ceramic electronic components each had an insulating member with a modulus as indicated in FIG. 4. The maximum stress may refer to an internal stress observed in the body in the vicinity of the first surface directly contacting the band electrode. The normalized maximum stress may refer to a value obtained by dividing the internal stress for a sample by the internal stress in the comparative sample without the insulating member. Referring to the drawings, a ceramic electronic component 100A according to an example embodiment may include a body 110 including a dielectric layer 111 and internal electrodes 121 and 122, band electrodes 131b and 132b disposed on the body 110, and a plurality of insulating members 151, 152, 153, and 154 disposed on the body 110. If desired, the ceramic electronic component 100A may further include connection electrodes 131a and 131b disposed on the body 110, metal layers 131c and 132c disposed on the band electrodes 131b and 132b, and/or insulating layers 141 and 142 disposed on the connection electrodes 131a and 131b.

The body 110 may have a shape similar to a rectangular parallelepiped having a first surface 1 and a second surface 2 opposing each other in a first direction (or the T direction), a third surface 3 and a fourth surface 4 opposing each other in a second direction (or the L direction), and a fifth surface 5 and a sixth surface 6 opposing each other each other in a third direction (or the W direction). If desired, the angular shape of the body 110, that is, for example, a corner portion thereof, may be polished to be rounded by a polishing process.

In the body 110, the dielectric layer 111 and the internal electrodes 121 and 122 may be alternately laminated. The plurality of dielectric layers 111 may be in a fired state, and a boundary between the dielectric layers 111 adjacent to each other may be integrated with each other such that the boundary may not be distinct without using a scanning electron microscope (SEM).

The dielectric layer 111 may be formed by firing a ceramic green sheet including ceramic powder, an organic solvent, and an organic binder. The ceramic powder may be a material having a high dielectric constant, and a barium titanate ($BaTiO_3$) material or a strontium titanate ($SrTiO_3$) material may be used, but an example embodiment thereof is not limited thereto. As such, the dielectric layer 111 may include a ferroelectric material, but an example embodiment thereof is not limited thereto. A plurality of the dielectric layer 111 may be laminated and sintered, and may be integrated with each other such that a boundary between the layers adjacent to each other may not be visually distinct.

The internal electrodes 121 and 122 may be formed by a conductive paste including a conductive metal. For example, the internal electrodes 121 and 122 may be printed by printing a conductive paste on a ceramic green sheet forming the dielectric layer 111 through a printing method such as a screen-printing method or a gravure printing method. By alternately laminating ceramic green sheets on which the internal electrodes 121 and 122 are printed and, if desired, further laminating ceramic green sheets in upper and lower portions, and firing the sheets, the body 110 described above may be formed. The conductive metal may include nickel (Ni), copper (Cu), palladium (Pd), and/or alloys thereof, but an example embodiment thereof is not limited thereto.

The internal electrodes 121 and 122 may include a plurality of first internal electrodes 121 and a plurality of second internal electrodes 122. The plurality of first and second internal electrodes 121 and 122 may be separated from each other with the dielectric layer 111 interposed therebetween. The plurality of first and second internal electrodes 121 and 122 may be alternately disposed with the dielectric layer 111 interposed therebetween. The plurality of first and second internal electrodes 121 and 122 may be alternately laminated in the first direction and may be exposed to the third surface 3 and the fourth surface 4 of the body 110, respectively. However, an example embodiment thereof is not limited thereto, and the plurality of first and second internal electrodes 121 and 122 may be disposed in other forms. For example, the plurality of first and second internal electrodes 121 and 122 may be alternately laminated in the third direction and may be exposed to the third surface 3 and the fourth surface 4 of the body 110, respectively. However, an example embodiment thereof is not limited thereto.

If desired, the plurality of first and second internal electrodes 121 and 122 may be directly connected to the first and second band electrodes 131b and 132b, respectively, that is, for example, the plurality of first and second internal electrodes 121 and 122 may be alternately laminated and may be exposed to a portion and the other portion of the first surface 1, respectively, and in this case, the first and second connecting electrodes 131a and 132a and the first and second insulating layers 141 and 142 may not be provided. The arrangement above may be varied.

The body 110 may include a capacitance forming portion Ac disposed in the body 110 and having capacitance including the plurality of first and second internal electrodes 121 and 122 disposed to oppose each other with the dielectric layer 111 interposed therebetween. The capacitance forming portion Ac may contribute to the formation of capacitance of the capacitor, and may be formed by alternately laminating the plurality of first and second internal electrodes 121 and 122 with the dielectric layer 111 interposed therebetween.

If desired, cover portions 112 and 113 may be disposed on the upper and lower portions of the capacitance forming portion Ac in the first direction, respectively. The cover portions 112 and 113 may include a first cover portion 112 disposed above the capacitance forming portion Ac in the first direction and a second cover portion 113 disposed below the capacitance forming portion Ac in the first direction. The cover portions 112 and 113 may be formed by laminating a single dielectric layer or two or more dielectric layers on the upper and lower surfaces of the capacitance forming portion Ac, respectively, in the first direction, and may prevent damages to the internal electrodes caused by physical or chemical stress. The cover portions 112 and 113 may not include internal electrodes and may include the same material as that of the dielectric layer 111. For example, the cover portions 112 and 113 may include a ceramic material, such as, for example, a barium titanate ceramic material, but an example embodiment thereof is not limited thereto.

If desired, margin portions 114 and 115 may be disposed on the side surface of the capacitance forming portion Ac. The margin portions 114 and 115 may include a first margin portion 114 and a second margin portion 115 disposed on both side surfaces of the capacitance forming portion Ac in the third direction and providing the fifth surface 5 and the sixth surface 6 of the body 110, respectively. The margin portions 114 and 115 may also be disposed on both side surfaces of each of the cover portions 112 and 113 in the third direction. For example, the margin portions 114 and 115 may provide both cross-sectional surfaces of the body 110 in the third direction. The margin portions 114 and 115 may refer to regions between both ends of the plurality of first and second internal electrodes 121 and 122 and a boundary surface of the body 110 on the cross-sectional surface of the body 110 taken in the first and third directions. The margin portions 114 and 115 may prevent damages to the internal electrode caused by physical or chemical stress.

The margin portions 114 and 115 may be formed by forming the internal electrodes 121 and 122 by applying a conductive paste to the ceramic green sheet other than the region in which the margin portions 114 and 115 are formed. Also, to prevent a step difference formed by the internal electrodes 121 and 122, after the ceramic green sheets on which the internal electrodes 121 and 122 are formed are laminated, the sheets may be cut out to expose both ends of the internal electrodes 121 and 122, a single dielectric layer or two or more dielectric layers may be laminated on both side surfaces of the capacitance forming portion Ac taken in the third direction, thereby forming the margin portions 114 and 115. For example, the margin portions 114 and 115 may include a ceramic material, such as, for example, a barium titanate ceramic material, but an example embodiment thereof is not limited thereto.

The first connection electrode 131a may be disposed on the third surface 3 of the body 110 and may be connected to the plurality of first internal electrodes 121. The second connection electrode 132a may be disposed on the fourth surface 4 of the body 110, and may be connected to the plurality of second internal electrodes 122. In this case, if desired, the first insulating layer 141 may be disposed on the first connection electrode 131a, and the second insulating layer 142 may be disposed on the second connection electrode 132a.

Generally, when an external electrode is formed, a method of dipping the surface of the body from which an internal electrode is exposed in the paste including a conductive metal may be used. However, as for the external electrode formed by the dipping method, a thickness of the external electrode in the central portion in the thickness direction may increase excessively. Also, in addition to the non-uniform thickness of the external electrodes by using the dipping method, the internal electrodes may be exposed to the third and fourth surfaces 3 and 4 of the body, such that, to prevent permeation of moisture and plating solution through the external electrodes, it may be necessary to increase the thickness of the external electrode disposed on the third surface 3 and the fourth surface 4 to a predetermined thickness or more.

Differently from the above example, in the ceramic electronic component 100A according to an example embodiment, the first and second insulating layers 141 and 142 may be disposed on the first and second connection electrodes 131a and 132a, such that, even when the thicknesses of the first and second connection electrodes 131a and 132a on the third surface 3 and the fourth surface 4 of the body 110 from which the internal electrodes 121 and 122 are exposed are decreased, sufficient reliability may be secured.

The first and second connection electrodes 131a and 132a may have a shape corresponding to the third surface 3 and the fourth surface 4 of the body 110, respectively, and the surfaces of the first and second connection electrodes 131a and 132a opposing the body 110 may have the same sizes as those of the third surface 3 and the fourth surface 4 of the body 110, respectively. The first and second connection electrodes 131a and 132a may be disposed within a range to not deviate from the third surface 3 and the fourth surface 4 of the body 110, respectively. That is, the first and second connection electrodes 131a and 132a may be disposed only on the third surface 3 and the fourth surface 4 of the body 110, respectively. The first and second connection electrodes 131a and 132a may not extend to the first surface 1, the second surface 2, the fifth surface 5, and the sixth surface 6 of the body 110.

The first and second connection electrodes 131a and 132a may have a uniform and thin thickness as compared to an external electrode formed by a general dipping method. The method of forming the first and second connection electrodes 131a and 132a is not limited to any particular example, and for example, the first and second connection electrodes 131a and 132a may be formed by transferring a sheet including a conductive metal and an organic material such as a binder to the third surface 3 and the fourth surface 4. The thickness of each of the first and second connection electrodes 131a and 132a is not limited to any particular size, and may be, for example, about 2 to 7 μm. The thickness of each of the first and second connection electrodes 131a and 132a may refer to a maximum thickness, such as, for example, a maximum thickness of each of the first and second connection electrodes 131a and 132a in the second direction.

The first and second connection electrodes 131a and 132a may include the same metal and glass as those included in the internal electrodes 121 and 122. As the first and second connection electrodes 131a and 132a include the same metal as the metal included in the internal electrodes 121 and 122, electrical connectivity with the internal electrodes 121 and 122 may improve, and as the first and second connection electrodes 131a and 132a include glass, coupling force with the body 110 and/or the insulating layers 141 and 142 may improve. The same metal as the metal included in the internal electrodes 121 and 122 may be nickel (Ni).

The first and second insulating layers 141 and 142 may be disposed on the first and second connection electrodes 131a and 132a, respectively, and may prevent a plating layer from being formed on the first and second connection electrodes 131a and 132a. Also, the first and second insulating layers 141 and 142 may reduce permeation of moisture or plating solution from the outside by improving sealing properties. The first and second insulating layers 141 and 142 may include an insulating material, and the insulating material is not limited to any particular material. Various insulating resins may be used. Also, an oxide including titanium (Ti)

may also be included. By applying oxide including titanium (Ti) instead of glass-based oxide, moisture resistance reliability may further improve, and cracks due to heat shrinkage and radiation cracks due to metal diffusion may be prevented.

The first band electrode 131b may be disposed on a region adjacent to the third surface 3 of the first surface 1 of the body 110. The second band electrode 132b may be disposed on a region adjacent to the fourth surface 4 of the first surface 1 of the body 110. The first and second band electrodes 131b and 132b may be electrically connected to the plurality of first and second internal electrodes 121 and 122 by being in contact with the first and second connection electrodes 131a and 132a, respectively. At least a portion of each of the first and second band electrodes 131b and 132b may extend to the first and second connection electrodes 131a and 132a and may be connected thereto. The first and second band electrodes 131b and 132b may extend from the first and second connection electrodes 131a and 132a to portions of the first surface 1 of the body 110, respectively.

The external electrode formed by the general dipping method may have an increased thickness on the third surface 3 and the fourth surface 4 of the body, and may also partially extend to the first surface 1, the second surface 2, and the fifth surface, and the sixth surface 6, such that it may be difficult to secure a high effective volume ratio.

Differently from the above example, in the ceramic electronic component 100A according to an example embodiment, the first and second connection electrodes 131a and 132a may be disposed on the surface from which the internal electrodes 121 and 122 are exposed, and the first and second band electrodes 131b and 132b may be disposed on the surface mounted on the substrate, thereby securing a high effective volume ratio.

In this case, when the internal electrodes 121 and 122 are laminated in the first direction, the ceramic electronic component 100A may be horizontally mounted on the substrate such that the internal electrodes 121 and 122 are disposed parallel to the mounting surface. However, an example embodiment thereof is not limited thereto, and when the internal electrodes 121 and 122 are laminated in the third direction, the internal electrodes 121 and 122 may be vertically mounted on the substrate of the ceramic electronic component 100A such that the internal electrodes 121 and 122 are disposed perpendicular to the mounting surface.

The first and second band electrodes 131b and 132b may be formed of any material having electrical conductivity, such as a metal, and a specific material may be determined in consideration of electrical properties and structural stability. For example, the first and second band electrodes 131b and 132b may be fired electrodes including conductive metal and glass, and may be formed by coating the first surface 1 of the body 110 with the paste including a conductive metal and glass. As the coating method, screen-printing may be used. As the conductive metal included in the first and second band electrodes 131b and 132b, a material having excellent electrical conductivity may be used, and the material is not limited to any particular material. For example, the conductive metal may be one or more of nickel (Ni), copper (Cu), and alloys thereof. For example, the conductive metal may include copper (Cu), but an example embodiment thereof is not limited thereto.

The first and second metal layers 131c and 132c may be disposed on the first and second band electrodes 131b and 132b. The first and second metal layers 131c and 132c may improve mounting properties. The type of the first and second metal layers 131c and 132c is not limited to any particular type, and the first and second metal layers 131c and 132c is may be plating layers including at least one of nickel (Ni), tin (Sn), palladium (Pd), and alloys thereof, or may include a plurality of layers. For example, each of the first and second metal layers 131c and 132c may have a form in which a nickel (Ni) layer and a tin (Sn) layer are formed in order.

The first and second metal layers 131c and 132c may be spaced apart from the first and second connection electrodes 131a and 132a by the first and second insulating layers 141 and 142. One end of each of the first and second metal layers 131c and 132c may be in contact with the first surface 1 of the body 110, and the other end may be in contact with the first and second insulating layers 141 and 142. For example, at least a portion of each of the first and second metal layers 131c and 132 may extend to the first and second insulating layers 141 and 142.

The plurality of insulating members 151, 152, 153, and 154 may be disposed between the first and second band electrodes 131b and 132b of the first surface 1 of the body 110. The plurality of insulating members 151, 152, 153, and 154 may be spaced apart from each other. The plurality of insulating members 151, 152, 153, and 154 may be connected to at least one of the first and second band electrodes 131b and 132b, respectively.

As described above, in the multilayer ceramic capacitor having a bottom electrode structure, a soldering area may be relatively reduced differently from a general electrode structure, such that a chip may easily fall off due to a decrease in adhesion strength when mounted on a substrate.

Differently from the above example, in the ceramic electronic component 100A according to an example embodiment, the plurality of insulating members 151, 152, 153 and 154 may be disposed between the first and second band electrodes 131b and 132b of the first surface 1 of the body 110, and accordingly, concentration of stress at a notch point may be dispersed. Accordingly, adhesion strength may improve when mounted on a substrate.

Specifically, as for the ceramic capacitor having a bottom electrode structure, according to the result of stress analysis of a lower portion of a chip generated during the adhesion strength test, the stress may be concentrated in the notch at the inner boundary between the lower surface of the ceramic body and the copper lower electrode. Due to the concentration of stress, breakage may occur in the notch during the adhesion strength test.

Differently from the above example, as in the ceramic electronic component 100A according to an example embodiment, when the plurality of insulating members 151, 152, 153, and 154 are disposed on the first surface 1 of the body 110, that is, for example, when the plurality of insulating members 151, 152, 153, and 154 are disposed on the first surface 1 of the body 110 to be connected to the first and second band electrodes 131b and 132b, the concentration of stress at the notch may be dispersed to the plurality of insulating members 151, 152, 153, and 154 and the stress may be greatly reduced, and accordingly, adhesion strength may effectively improve when mounted on a substrate.

Also, as in the ceramic electronic component 100A according to an example embodiment, when the plurality of insulating members 151, 152, 153, and 154 spaced apart from each other are disposed on the first surface 1 of the body 110, rather than simply forming a single insulating member filling a space between the first and second band electrodes 131b and 132b, a side effect caused by mismatching in the coefficients of thermal expansion between the first and second band electrodes 131b and 132b and the plurality of insulating members 151, 152, 153, and 154 may be reduced in view of thermal load. In this aspect, the first surface 1 of the body 110 may be exposed through the spaces between the plurality of insulating members 151, 152, 153, and 154.

Each of the plurality of insulating members 151, 152, 153, and 154 may include a ceramic material. For example, each of the insulating members 151, 152, 153, and 154 may include a ceramic material, such as, for example, a barium titanate ceramic material, but an example embodiment thereof is not limited thereto. As such, by using the same material as or a material similar to that of the dielectric layer 111 of the body 110, side effects due to the plurality of insulating members 151, 152, 153, and 154 may be reduced. In this case, each of the plurality of insulating members 151, 152, 153, and 154 may have a modulus of 75 GPa or more, such as, for example, about 75 GPa to 200 GPa. In this case, as illustrated in FIG. 4, the effect of stress reduction may greatly improve. The modulus may refer to an elastic modulus. An elastic modulus may refer to the ratio between stress and strain, and an elastic modulus may be measured through a standard tensile test specified in JIS C-6481, KS M 3001, KS M 527-3, ASTM D882, or the like, for example, but an example embodiment thereof is not limited thereto.

Each of the plurality of insulating members 151, 152, 153, and 154 may include an insulating resin and alumina. The insulating resin may be a thermosetting resin such as an epoxy resin, a thermoplastic resin such as polyimide, and the like, but an example embodiment thereof is not limited thereto, and other polymer resins may be used. In this case, each of the plurality of insulating members 151, 152, 153, and 154 may have a modulus of 250 GPa or more, such as, for example, about 250 GPa to 350 GPa. In this case, the effect of stress reduction may greatly improve. The modulus may refer to an elastic modulus. An elastic modulus may refer to the ratio between stress and strain, and an elastic modulus may be measured through a standard tensile test specified in JIS C-6481, KS M 3001, KS M 527-3, ASTM D882, or the like, for example, but an example embodiment thereof is not limited thereto.

The plurality of insulating members 151, 152, 153, and 154 may include a first insulating member 151, a second insulating member 152, a third insulating member 153, and a fourth insulating member 154. The first and second insulating members 151 and 152 may be connected to the first band electrode 131b. The third and fourth insulating members 153 and 154 may be connected to the second band electrode 132b. The first and third insulating members 151 and 153 may be spaced apart from each other with respect to the second direction. The second and fourth insulating members 152 and 154 may be spaced apart from each other in the second direction. The first and second insulating members 151 and 152 may be spaced apart from each other in the third direction. The third and fourth insulating members 153 and 154 may be spaced apart from each other in the third direction. By disposing the insulating members as above, the above-described effects may be obtained.

FIGS. 5A to 5F are process diagrams illustrating an example of a method of manufacturing the ceramic electronic component illustrated in FIG. 1.

Figure 5A:
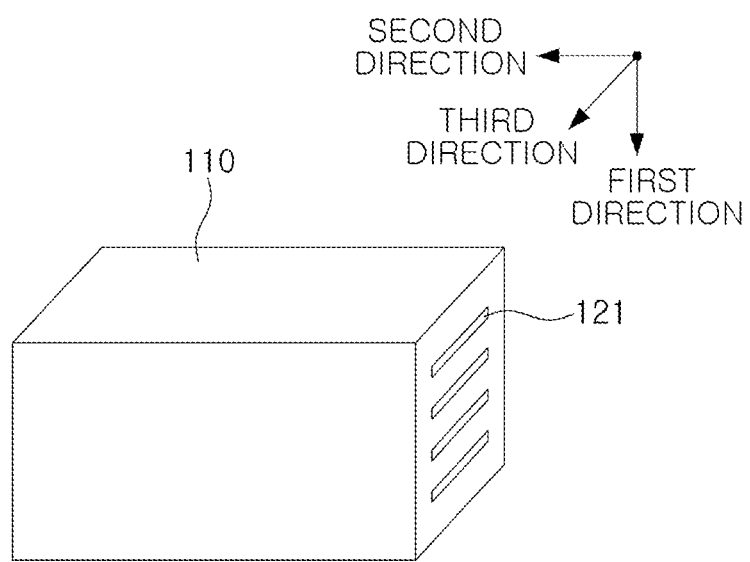
FIGS. 5A to 5F are process diagrams illustrating an example of a method of manufacturing the ceramic electronic component illustrated in FIG. 1.

Referring to FIG. 5A, the body 110 may be prepared. The body 110 may be formed by laminating ceramic green sheets on which the internal electrodes 121 and 122 are printed, and, if desired, further laminating ceramic green sheets on upper and lower portions, and firing the sheets. If desired, the body 110 may be formed by cutting the laminate to expose ends of the internal electrodes 121 and 122, further laminating ceramic green sheets on both side portions, and firing the sheets. The ceramic green sheet may be formed by firing a sheet including an organic solvent and an organic binder.

Figure 5B:
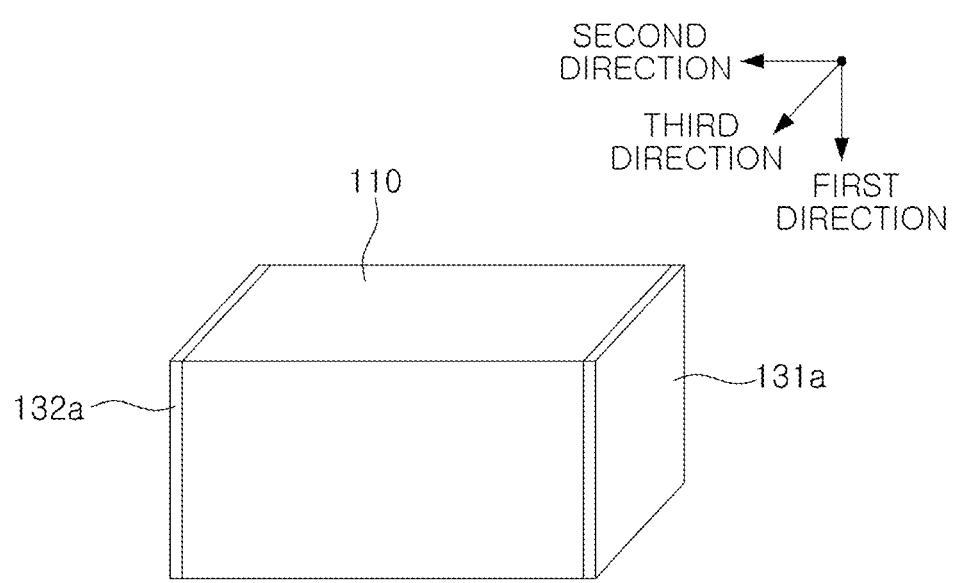

Referring to FIG. 5B, connection electrodes 131a and 132a may be formed to be connected to the internal electrodes 121 and 122 on both side surfaces of the head in the second direction of the body 110. The connection electrodes 131a and 132a may be formed by transferring a sheet including a conductive metal or an organic material such as a binder to head surfaces of both sides of the body 110 in the second direction. Accordingly, the connection electrodes 131a and 132a having a uniform and thin thickness may be formed only on the head surfaces of both sides of the body 110 in the second direction.

Figure 5C:
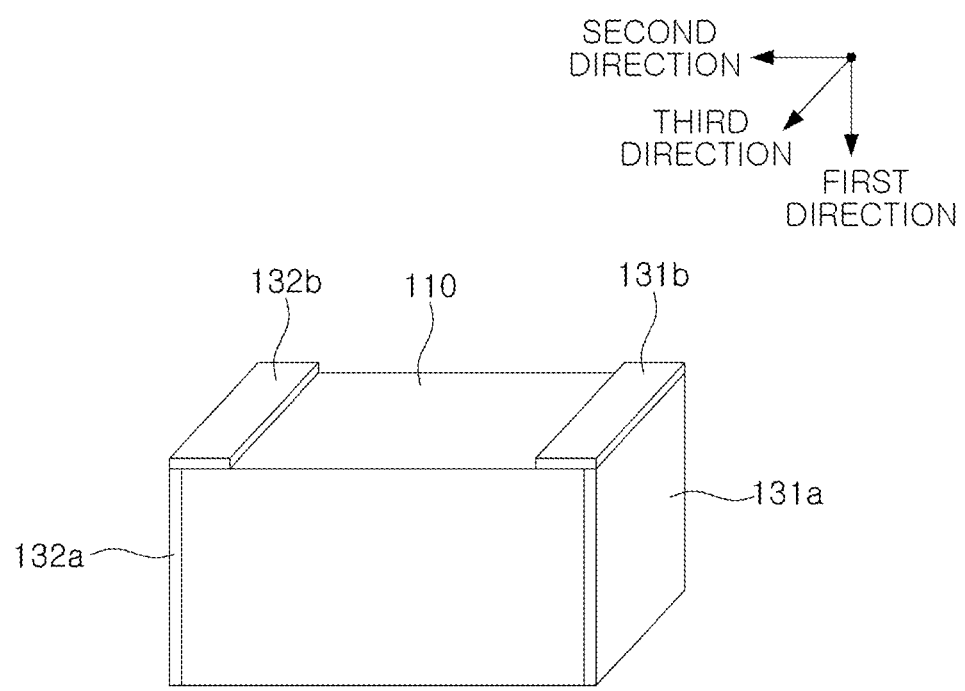

Referring to FIG. 5C, the band electrodes 131b and 132b may be formed to be connected to the connection electrodes 131a and 132a on a band portion on one side of the body 110 in the first direction. The band electrodes 131b and 132b may be formed by applying a conductive metal and glass paste by screen-printing and firing the paste. Accordingly, the band electrodes 131b and 132b may be formed only on the band portion on one side of the body 110 in the first direction, a high effective volume ratio may be secured.

Figure 5D:
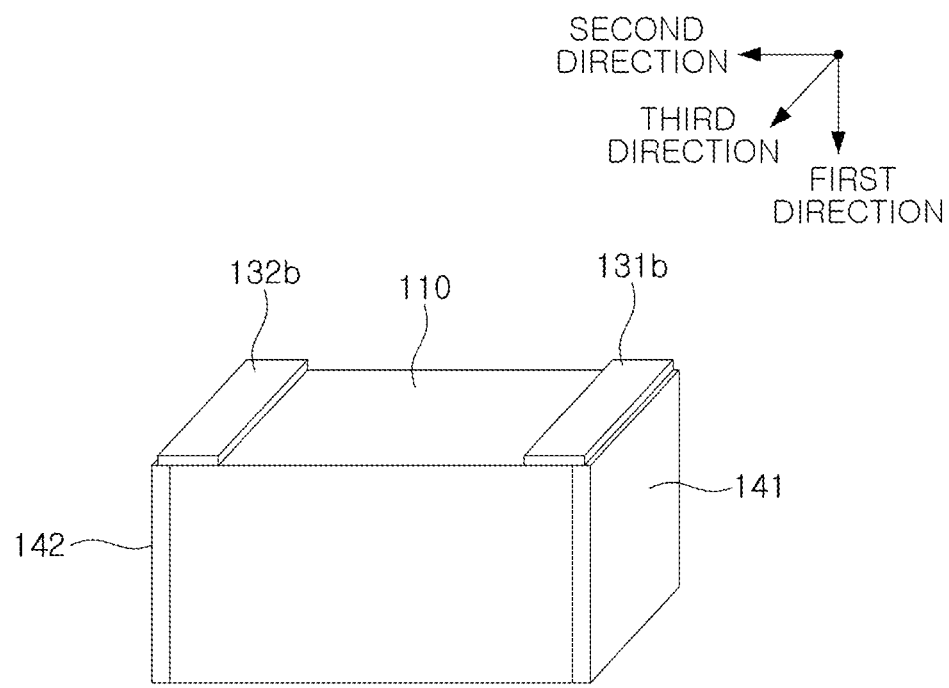

Referring to FIG. 5D, insulating layers 141 and 142 covering the connection electrodes 131a and 132a may be formed. The plating layer may be prevented from being formed in the first direction through the insulating layers 141 and 142. Also, sealing properties may improve. The insulating layers 141 and 142 may be formed by applying an insulating resin to cover the connecting electrodes 131a and 132a and curing the insulating resin. Alternatively, the insulating layers 141 and 142 may be formed by coating an oxide including glass and/or titanium (Ti).

Figure 5E:
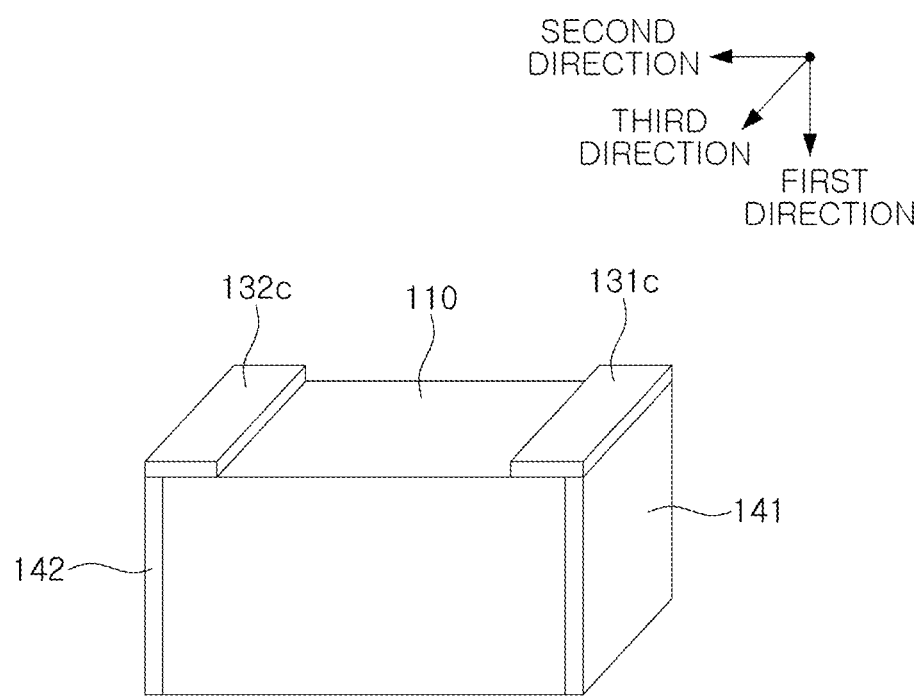

Referring to FIG. 5E, metal layers 131c and 132c covering the band electrodes 131b and 132b may be formed. The metal layers 131c and 132c may be plating layers formed through a plating process. The plating layer may include a plurality of plating layers. For example, the plating layer may be formed by performing nickel (Ni) plating and tin (Sn) plating in order.

Figure 5F:
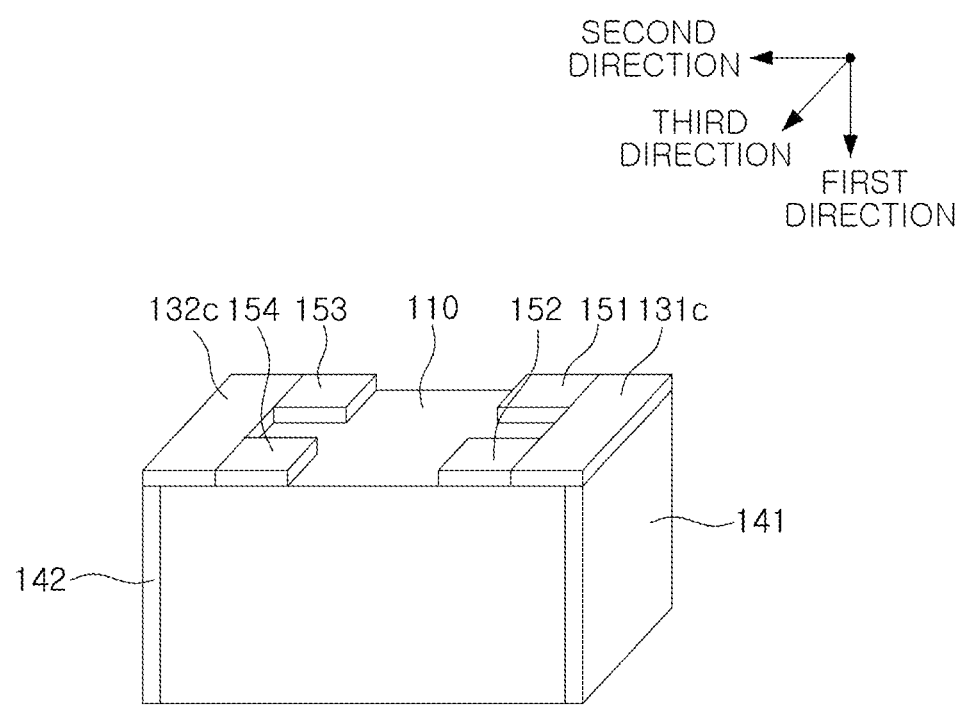

Referring to FIG. 5F, the plurality of insulating members 151, 152, 153, and 154 may be formed between the band electrodes 131b and 132b on one side of the body 110 in the first direction. The plurality of insulating members 151, 152, 153, and 154 may be formed by coating an insulator. For example, the plurality of insulating members 151, 152, 153, and 154 may be formed by applying a ceramic material to the body 110 and firing and/or sintering the ceramic material. Alternatively, the plurality of insulating members 151, 152, 153, and 154 may be formed by applying an insulating material including an insulating resin and alumina to the body 110 and curing the insulating material. Alternatively, the plurality of insulating members 151, 152, 153, and 154 may be formed by applying other insulating materials on the body 110 and drying the insulating material.

The ceramic electronic component 100A according to the aforementioned example may be manufactured through a series of the processes, but the manufacturing process is not limited thereto.

The other descriptions are substantially the same as those of the ceramic electronic component 100A in the aforementioned example embodiment, and thus, overlapping descriptions will not be provided.

Figure 6:
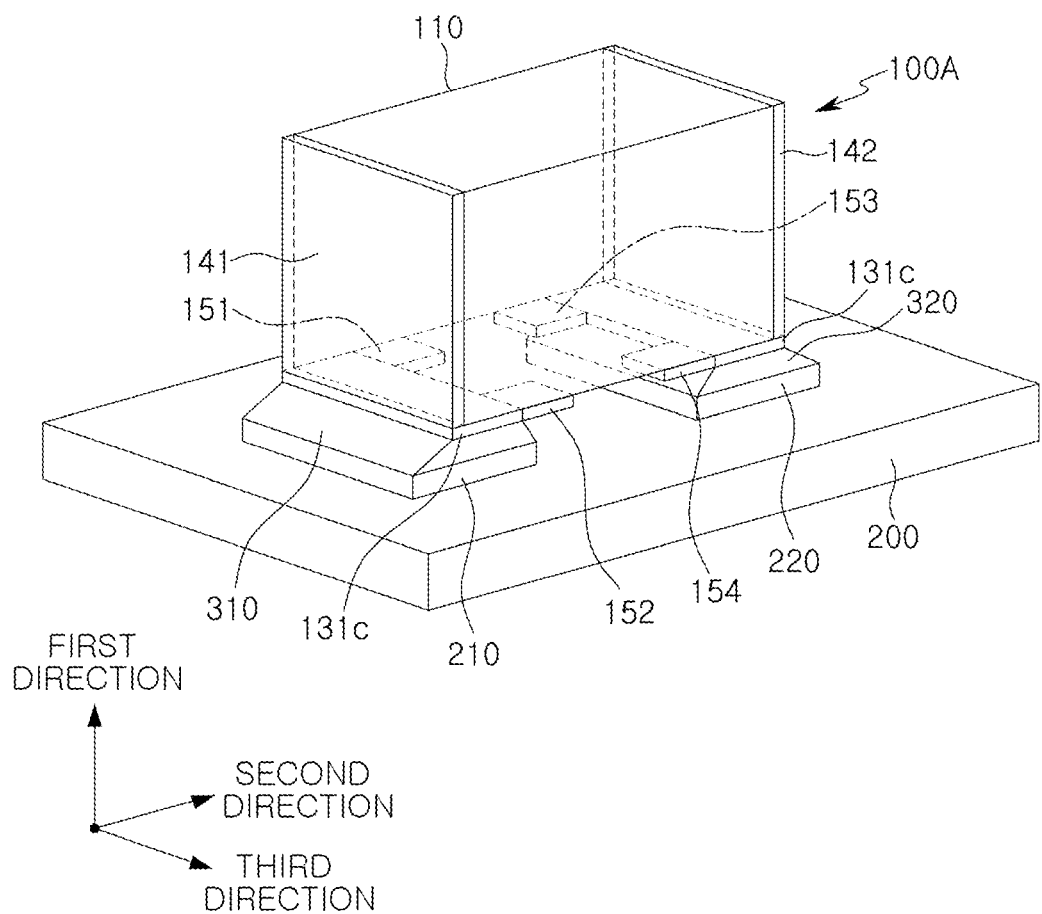
FIG. 6 is a perspective diagram illustrating an example of mounting a ceramic electronic component illustrated in FIG. 1 on a substrate.

FIG. 6 is a perspective diagram illustrating an example of mounting a ceramic electronic component illustrated in FIG. 1 on a substrate.

In FIG. 6, to illustrate the lower structure of the ceramic electronic component, components in the body, such as, for example, internal electrodes, are not illustrated.

Referring to the drawings, the ceramic electronic component 100A according to the aforementioned example embodiment may be mounted on electrode pads 210 and 220 of the printed circuit board 200 through conductive adhesives 310 and 320 such as solder. The first and second metal layers 131c and 132c may be electrically connected to the first and second electrode pads 210 and 220 through the first and second conductive adhesives 310 and 320, respectively. Accordingly, the first and second electrode pads 210 and 220 may be electrically connected to the first and second band electrodes 131b and 132b, respectively, and may also be electrically connected to the first and second connection electrodes 131a and 132a via the first and second band electrodes 131b and 132b, respectively. Accordingly, the first and second electrode pads 210 and 220 may be electrically connected to the plurality of first and second internal electrodes 121 and 122, respectively.

As described above, the ceramic electronic component 100A according to an example embodiment may be mounted on the printed circuit board 200, and in this case, the ceramic electronic component 100A may have improved adhesion strength as described above. Also, since the ceramic electronic component 100A may have a bottom electrode structure, a high effective volume ratio may be secured.

The other descriptions are substantially the same as those of the ceramic electronic component 100A in the aforementioned example embodiment, and thus, overlapping descriptions will not be provided.

Figure 7:
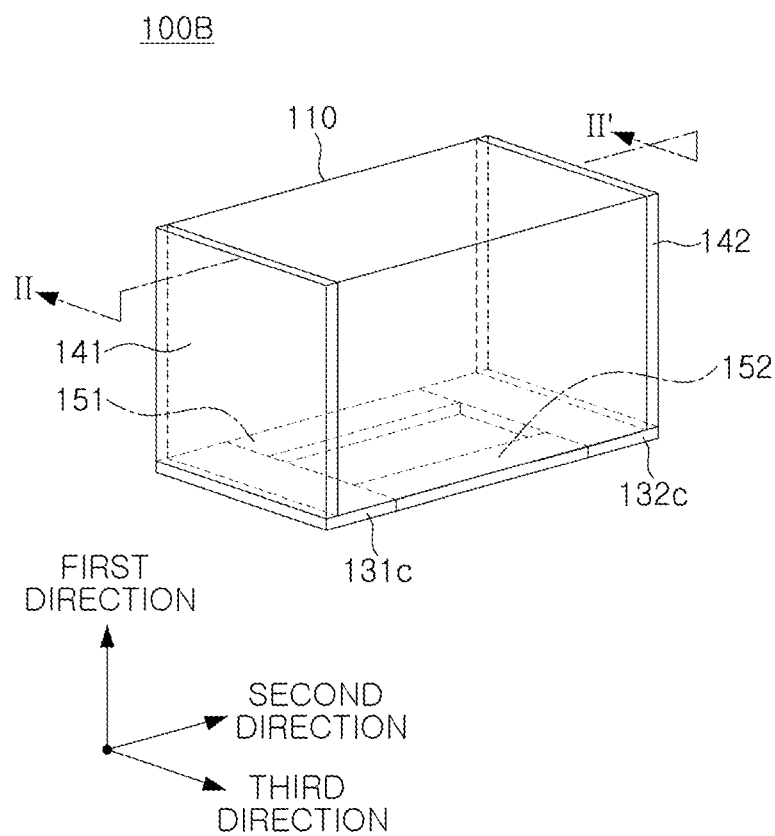
FIG. 7 is a perspective diagram illustrating a ceramic electronic component according to another example embodiment of the present disclosure.

FIG. 7 is a perspective diagram illustrating a ceramic electronic component according to another example embodiment.

Figure 8:
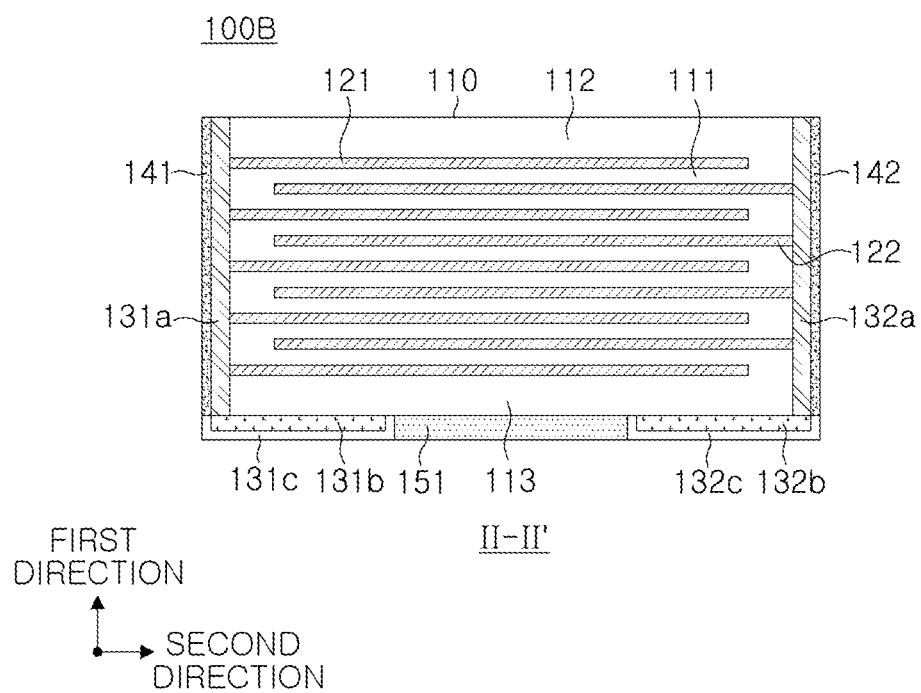
FIG. 8 is a cross-sectional diagram taken along line II-II' in FIG. 7.

FIG. 8 is a cross-sectional diagram taken along line II-II' in FIG. 7.

Figure 9:
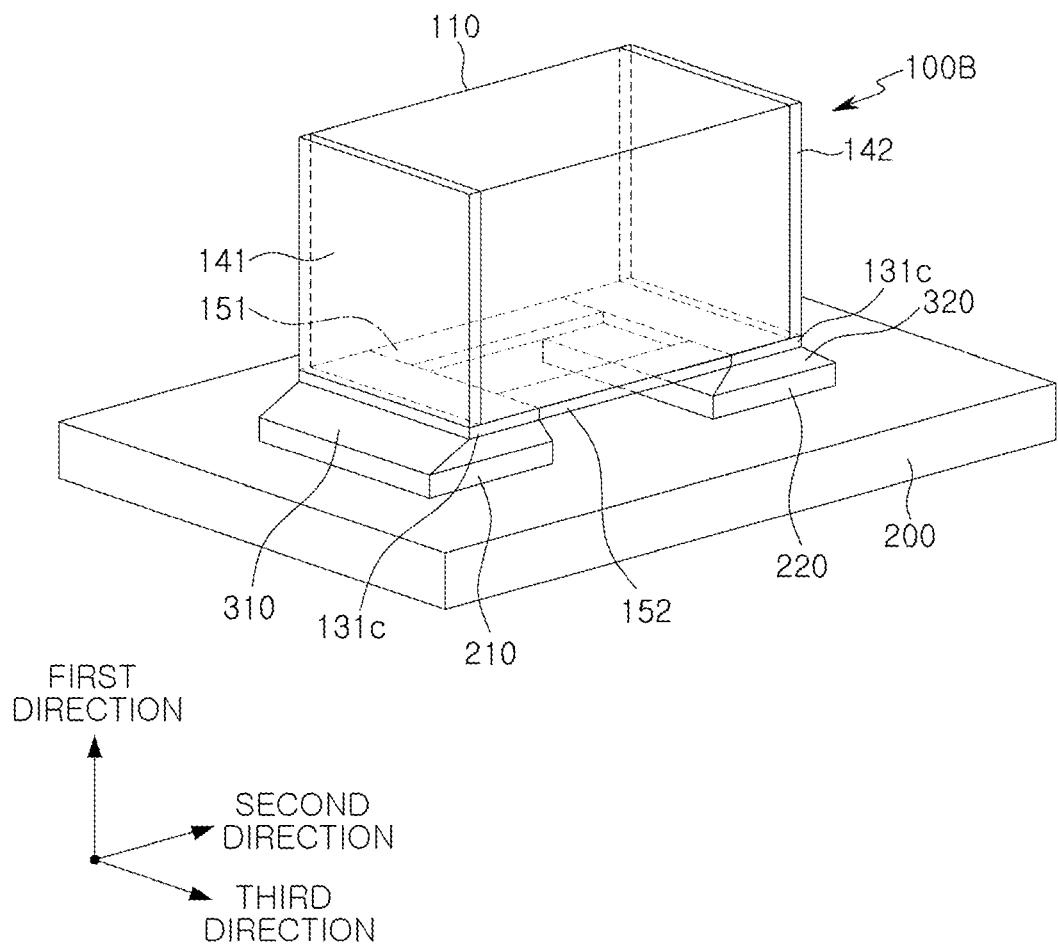
FIG. 9 is a perspective diagram illustrating an example of mounting a ceramic electronic component illustrated in FIG. 7 on a substrate.

FIG. 9 is a perspective diagram illustrating an example of mounting a ceramic electronic component illustrated in FIG. 7 on a substrate.

In FIGS. 7 and 9, to illustrate the lower structure of the ceramic electronic component, components in the body, such as, for example, internal electrodes, are not illustrated.

Referring to the drawings, in the ceramic electronic component 100B according to another example embodiment, first and second insulating members 151 and 152 may be spaced apart from each other with respect to the second direction and may be partially disposed on the first surface of the body 110. Each of the first and second insulating members 151 and 152 may have an elongated shape in the third direction. The first and second insulating members 151 and 152 may be connected to the first and second band electrodes 131b and 132b, respectively. The first and second insulating members 151 and 152 may be connected to the first and second metal layers 131c and 132c, respectively.

The other descriptions are substantially the same as those of the ceramic electronic component 100A, the method of manufacturing the ceramic electronic component 100A, and a mounting substrate thereof in the aforementioned example embodiments, and thus, overlapping descriptions will not be provided.

Figure 10:
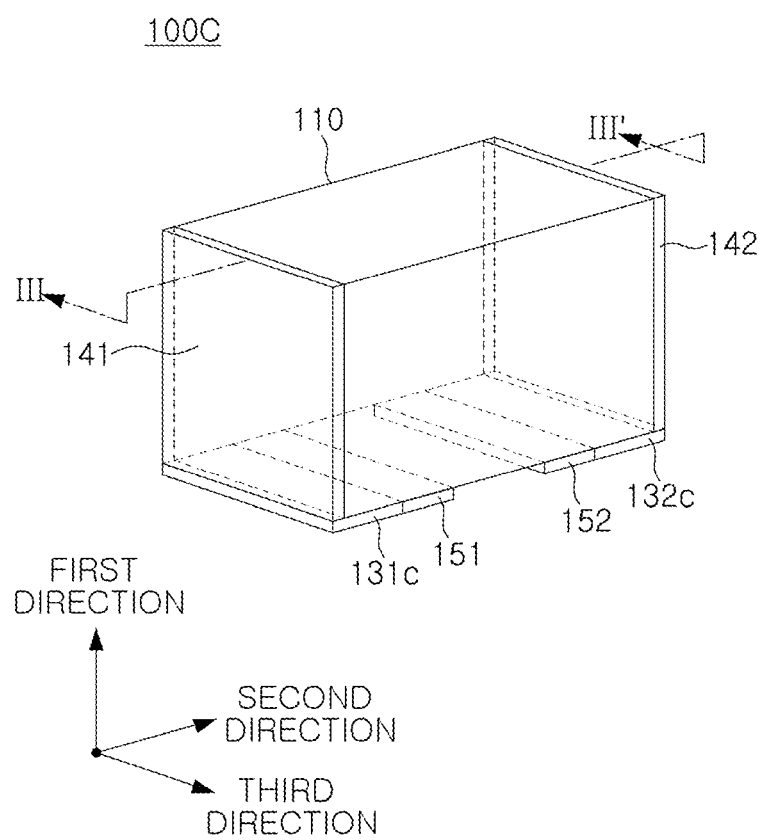
FIG. 10 is a perspective diagram illustrating a ceramic electronic component according to another example embodiment of the present disclosure.

FIG. 10 is a perspective diagram illustrating a ceramic electronic component according to another example embodiment.

Figure 11:
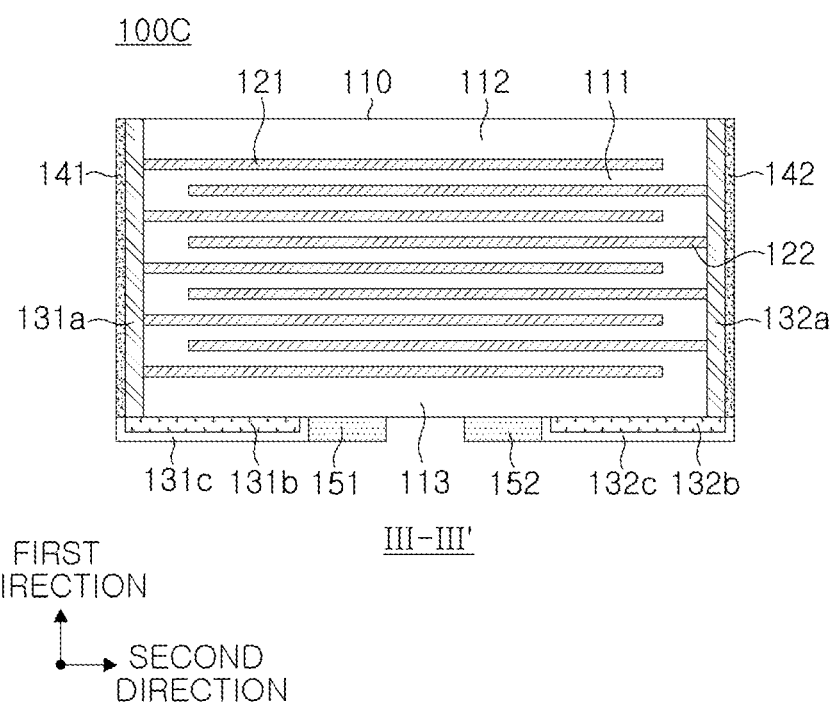
FIG. 11 is a cross-sectional diagram taken along line III-III' in FIG. 10.

FIG. 11 is a cross-sectional diagram taken along line III-III' in FIG. 10.

Figure 12:
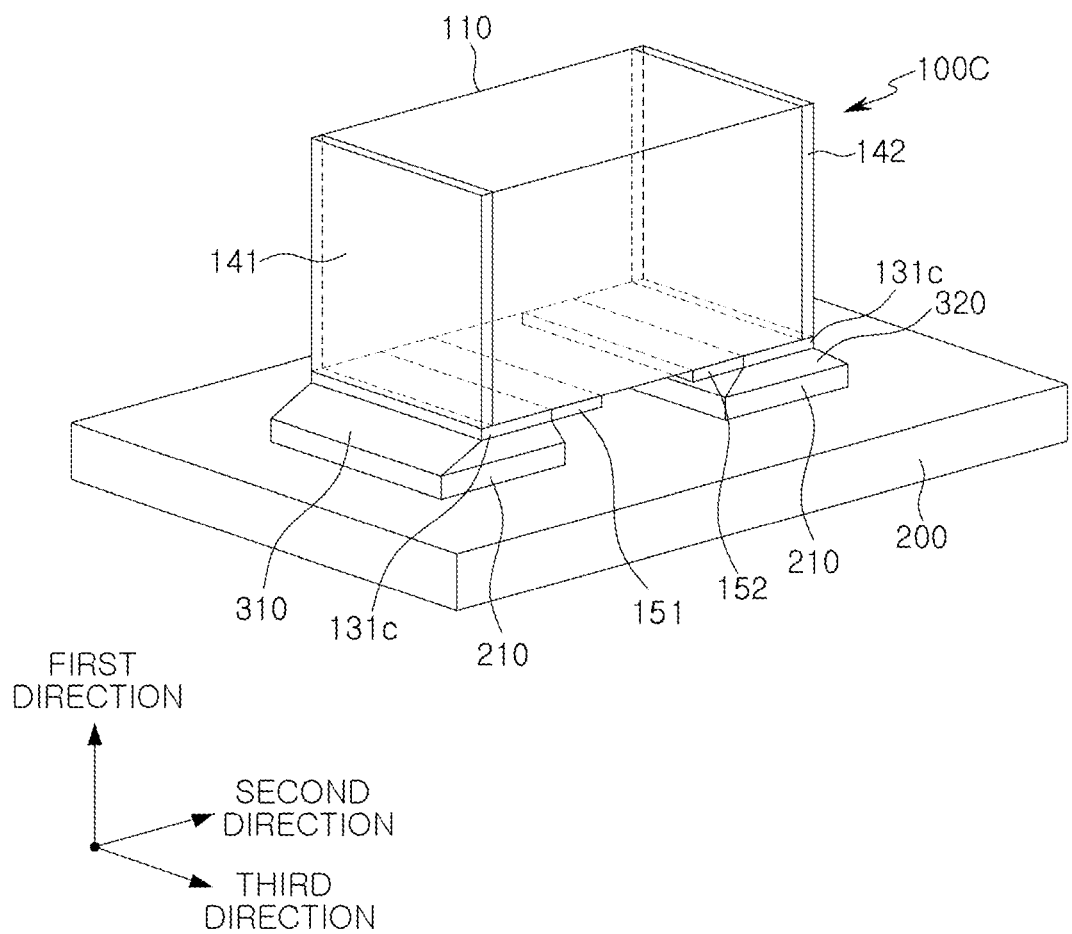
FIG. 12 is a perspective diagram illustrating an example of mounting a ceramic electronic component illustrated in FIG. 10 on a substrate.

FIG. 12 is a perspective diagram illustrating an example of mounting a ceramic electronic component illustrated in FIG. 10 on a substrate.

In FIGS. 10 and 12, to illustrate the lower structure of the ceramic electronic component, components in the body, such as, for example, internal electrodes, are not illustrated.

Referring to the drawings, in a ceramic electronic component 100C according to another example embodiment, the first and second insulating members 151 and 152 may be spaced apart from each other with respect to the third direction and may be partially disposed on the first surface of the body 110. Each of the first and second insulating members 151 and 152 may have an elongated shape in the second direction. The first insulating member 151 may be connected to a portion of each of the first and second band electrodes 131b and 132b. The first insulating member 151 may be connected to a portion of each of the first and second metal layers 131c and 132c. The second insulating member 152 may be connected to another portion of each of the first and second band electrodes 131b and 132b. The second insulating member 152 may be connected to another portion of each of the first and second metal layers 131c and 132c.

The other descriptions are substantially the same as those of the ceramic electronic component 100A, the method of manufacturing the ceramic electronic component 100A, and a mounting substrate thereof in the aforementioned example embodiments, and thus, overlapping descriptions will not be provided.

In the example embodiments, a multilayer ceramic capacitor has been described as an example of a ceramic electronic component, but an example embodiment thereof is not limited thereto, and the example embodiments may also be applicable to other types of ceramic electronic components, such as an inductor, a piezoelectric device, a varistor, and a thermistor.

According to the aforementioned example embodiments, a ceramic electronic component may have improved adhesion strength when mounted on a board.

In the example embodiments, the terms "side portion," "side surface," and the like, may be used to refer to a surface formed taken in right/left directions with reference to a cross-sectional surface in the diagrams for ease of description, the terms "upper side," "upper portion," "upper surfaces," and the like, may be used to refer to a surface formed in an upward direction with reference to a cross-sectional surface in the diagrams for ease of description, and the terms "lower side," "lower portion," "lower surface," and the like, may be used to refer to a surface formed in a downward direction. The notion that an element is disposed on a side region, an upper side, an upper region, or a lower resin may include the configuration in which the element is directly in contact with an element configured as a reference in respective directions, and the configuration in which the element is not directly in contact with the reference element. The terms, however, may be defined as above for ease of description, and the scope of right of the example embodiments is not particularly limited to the above terms.

In the example embodiments, the term "connected" may not only refer to "directly connected" but also include "indirectly connected" by means of an adhesive layer, or the like. Also, the term "electrically connected" may include both of the case in which elements are "physically connected" and the case in which elements are "not physically connected." Further, the terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right of the example embodiments.

In the example embodiments, the term "example embodiment" may not refer to one same example embodiment, and may be provided to describe and emphasize different unique features of each example embodiment. The above suggested example embodiments may be implemented do not exclude the possibilities of combination with features of other example embodiments. For example, even though the features described in one example embodiment are not described in the other example embodiment, the description may be understood as relevant to the other example embodiment unless otherwise indicated.

An expression used in the singular encompasses the expression of the plural, unless it has a clearly different meaning in the context.

While the example embodiments have been illustrated and described above, it will be apparent to those skilled in the art that modifications and variations could be made without departing from the scope of the present invention as defined by the appended claims.

What is claimed is:

1. A ceramic electronic component, comprising:
   a body including a dielectric layer and a plurality of first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
   a first band electrode disposed on a portion of the first surface adjacent to the third surface;
   a second band electrode disposed on another portion of the first surface adjacent to the fourth surface;
   a first metal layer disposed on the first band electrode so as to not overlap the plurality of first and second internal electrodes in the second direction;
   a second metal layer disposed on the second band electrode so as to not overlap the plurality of first and second internal electrodes in the second direction; and
   a plurality of insulating members disposed between the first and second band electrodes disposed on the first surface and spaced apart from each other,
   wherein the first surface is exposed through a space between the plurality of insulating members,
   wherein the second surface is devoid of any external electrode portion electrically connected to the first or second band electrode, and
   wherein at least one of the first metal layer or the second metal layer is arranged between the first band electrode or the second band electrode, respectively, and at least one of the plurality of insulating members in the second direction.

2. The ceramic electronic component of claim 1, wherein each of the first and second band electrodes is connected to at least two of the plurality of insulating members.

3. The ceramic electronic component of claim 1,
   wherein each of the plurality of insulating members includes a ceramic material, and
   wherein each of the plurality of insulating members has a modulus of 75 GPa or more.

4. The ceramic electronic component of claim 1,
   wherein each of the plurality of insulating members includes an insulating resin and alumina, and
   wherein each of the plurality of insulating members has a modulus of 250 GPa or more.

5. The ceramic electronic component of claim 1, wherein each of the first and second band electrodes includes copper (Cu).

6. The ceramic electronic component of claim 1, further comprising:
   a first connection electrode disposed on the third surface; and
   a second connection electrode disposed on the fourth surface,
   wherein at least portions of the first and second band electrodes extend to the first and second connection electrodes and are connected to the first and second connection electrodes, respectively.

7. The ceramic electronic component of claim 6, wherein each of the first and second connection electrodes includes nickel (Ni).

8. The ceramic electronic component of claim 6, further comprising:
   a first insulating layer disposed on the first connection electrode; and
   a second insulating layer disposed on the second connection electrode.

9. The ceramic electronic component of claim 8,
   wherein the first and second metal layers are spaced apart from the first and second connection electrodes, respectively.

10. The ceramic electronic component of claim 9, wherein each of the first and second metal layers includes a nickel (Ni) layer and a tin (Sn) layer disposed on the nickel (Ni) layer.

11. A ceramic electronic component, comprising:
    a body including a dielectric layer and a plurality of first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
    a first connection electrode disposed on the third surface;
    a first band electrode extending from the first connection electrode to a portion of the first surface;
    a second connection electrode disposed on the fourth surface;
    a second band electrode extending from the second connection electrode to a portion of the first surface;
    a first metal layer disposed on the first band electrode so as to not overlap the plurality of first and second internal electrodes in the second direction;
    a second metal layer disposed on the second band electrode so as to not overlap the plurality of first and second internal electrodes in the second direction; and
    a plurality of insulating members disposed between the first and second band electrodes on the first surface, respectively, and connected to at least one of the first and second band electrodes,
    wherein the second surface is devoid of any external electrode portion electrically connected to the first or second connection electrode, and
    wherein at least one of the first metal layer or the second metal layer is arranged between the first band electrode or the second band electrode, respectively, and at least one of the plurality of insulating members in the second direction.

12. The ceramic electronic component of claim 11, wherein the first and second connection electrodes are only disposed on the third and fourth surfaces, respectively.

13. The ceramic electronic component of claim 11, further comprising:
a first insulating layer disposed on the first connection electrode; and
a second insulating layer disposed on the second connection electrode,
wherein the first metal layer has at least a portion extending to the first insulating layer, and
wherein the second metal layer has at least a portion extending to the second insulating layer.

14. The ceramic electronic component of claim 11,
wherein the plurality of insulating members include first to fourth insulating members,
wherein each of the first and second insulating members is connected to the first band electrode,
wherein each of the third and fourth insulating members is connected to the second band electrode,
wherein the first and third insulating members are spaced apart from each other with respect to the second direction,
wherein the second and fourth insulating members are spaced apart from each other with respect to the second direction,
wherein the first and second insulating members are spaced apart from each other with respect to the third direction, and
wherein the third and fourth insulating members are spaced apart from each other with respect to the third direction.

15. The ceramic electronic component of claim 11,
wherein the plurality of insulating members include first and second insulating members,
wherein the first insulating member is connected to the first band electrode,
wherein the second insulating member is connected to the second band electrode, and
wherein the first and second insulating members are spaced apart from each other with respect to the second direction.

16. The ceramic electronic component of claim 11,
wherein the plurality of insulating members include first and second insulating members,
wherein the first insulating member is connected to each of the first and second band electrodes,
wherein the second insulating member is connected to each of the first and second band electrodes, and
wherein the first and second insulating members are spaced apart from each other with respect to the third direction.

17. A ceramic electronic component, comprising:
a body including a dielectric layer and a plurality of first and second internal electrodes alternately disposed with the dielectric layer interposed therebetween, and including first and second surfaces opposing each other in a stacking direction of the plurality of first and second internal electrodes;
only two band electrodes disposed on the first surface;
a first metal layer disposed on the first band electrode so as to not overlap the plurality of first and second internal electrodes in a direction perpendicular to the stacking direction;
a second metal layer disposed on the second band electrode so as to not overlap the plurality of first and second internal electrodes in the direction perpendicular to the stacking direction; and
at least one insulating member disposed on the first surface and between the two band electrodes in a length direction,
wherein the ceramic electronic component has a bottom electrode structure such that the second surface is devoid of any external electrode portion electrically connected to either of the two band electrodes, and
wherein at least one of the first metal layer or the second metal layer is arranged between one of the two band electrodes and the at least one insulating member in the length direction.

18. The ceramic electronic component of claim 17,
wherein the at least one insulating member includes two or more insulating members that are spaced apart from each other.

19. The ceramic electronic component of claim 18,
wherein a portion of the first surface is exposed through a space between the two or more insulating members.

20. The ceramic electronic component of claim 17,
wherein the two band electrodes cover at least a portion of the first surface and the at least one insulating member is disposed on an entirety of the first surface that is not covered by the two band electrodes.

21. The ceramic electronic component of claim 17,
wherein the at least one insulating member includes a same material as the dielectric layer.

* * * * *